United States Patent Office 3,007,938
Patented Nov. 7, 1961

3,007,938
1-(3-INDAZOLECARBONYL)-HYDRAZINES AND THEIR PREPARATION
Frederick K. Kirchner, Bethlehem, N.Y., assignor to Sterling Drug Inc., New York, N.Y., a corporation of Delaware
No Drawing. Filed Apr. 17, 1959, Ser. No. 807,011
20 Claims. (Cl. 260—310)

This invention relates to substituted hydrazines.

The invention herein resides in the concept of compositions of matter having a molecular structure obtained when a 3-indazole- group is joined through a carbonyl group to hydrazine or the known types of hydrazine derivatives, together with a process for physically embodying such concept, and the utility inherent in the embodiments so produced.

The compounds of the invention can be represented in the broad sense by the generalized formula

Y—CONHN=B wherein Y represents a 3-indazole moiety and N=B represents a member of the group consisting of

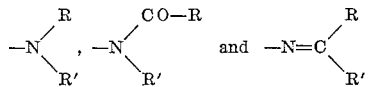

wherein R and R' represent hydrogen, a lower-aliphatic hydrocarbon, monocarbocyclic aryl substituted lower-aliphatic hydrocarbon, or a monocarbocyclic aryl group.

The symbol "Y," as used herein, represents an unsubstituted indazole or an indazole group substituted in the benzene ring by one or more substituents inert to the reaction conditions and reagents used in the process for preparing the compounds. Such inert substituents include, without limitation, lower-alkyl, lower-alkoxy, lower-alkylmercapto, lower-alkylsulfinyl, lower-alkylsulfonyl, halogen, nitro, dialkylamino and trifluoromethyl groups; as well as additional hydrogen atoms, in which latter case the corresponding tetrahydro compounds result; and, the 3-indazole-group can also include a lower-aliphatic hydrocarbon, monocarbocylic aryl substituted lower-aliphatic hydrocarbon, or monocarbocyclic aryl substituent, as hereinafter defined, on either of the nitrogen atoms of the pyrazole ring.

A particular aspect of the invention relates to hydrazines having the formula

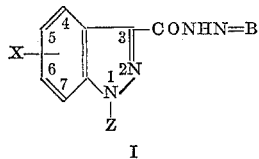

wherein Z represents a member of the group consisting of lower-aliphatic hydrocarbon, phenyl and benzyl; X represents a member of the group consisting of hydrogen and lower-alkyl, lower-alkoxy, nitro, halogen and amino groups; and N=B represents a member of the group consisting of

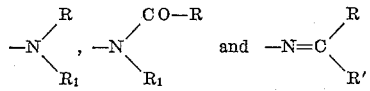

wherein R and R' are members of the group consisting of hydrogen, lower-aliphatic hydrocarbon, monocarbocyclic aryl substituted lower-aliphatic hydrocarbon, and monocarbocyclic aryl groups.

In the above general Formula I, Z represents a hydrogen atom or a substituent selected from lower-aliphatic hydrocarbon, phenyl and benzyl radicals. When Z stands for a lower-aliphatic hydrocarbon radical it represents saturated or unsaturated radicals, i.e., lower-alkyl, lower-alkenyl, or lower-alkynyl radicals having from one to about six carbon atoms, such as methyl, ethyl, propyl, isopropyl, butyl, tertiary-butyl, pentyl, hexyl, 1-propenyl, 2-propenyl (allyl), 2-butenyl, ethynyl, propargyl, and the like.

In the above general Formula I, X represents a hydrogen atom or a lower-alkyl, lower-alkoxy, nitro, halogen or amino radical. The X substituent lower-alkyl and lower-alkoxy radicals have preferably from one to about six carbon atoms, thus including such radicals as methyl, ethyl, propyl, isopropyl, butyl, sec-butyl, pentyl, hexyl, and the like for lower-alkyl and methoxy, ethoxy, propoxy, butoxy, isobutoxy, pentoxy, hexoxy and the like for lower-alkoxy. The halogen can be any of the halogens fluorine, chlorine, bromine or iodine.

The N=B in the above general Formula I represents one of

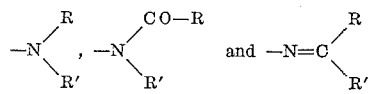

wherein R and R' can be the same or different and represent a hydrogen atom or a substituent selected from lower-aliphatic hydrocarbon, monocarbocyclic aryl substituted lower-aliphatic hydrocarbon, and monocarbocyclic aryl radicals. When R or R' stands for a lower-aliphatic hydrocarbon radical, it stands for the same type of lower-aliphatic radicals as described above.

When R or R' represents a monocarbocyclic aryl substituted lower-aliphatic hydrocarbon radical, it stands for the same type of lower-aliphatic radicals as described above substituted by a phenyl radical having one or more substituents such as fluoro, chloro, bromo, iodo, nitro, lower-alkyl, lower-alkoxy or lower-alkylmercapto. A preferred class of monocarbocyclic aryl radicals comprises phenyl and phenyl substituted by from one to three substituents selected from fluoro, chloro, bromo, iodo, nitro, lower-alkyl, lower-alkoxy and lower-alkylmercapto. Thus R and R' can represent, for example, benzyl, 2-phenylethyl, 3-phenylpropyl, cinnamyl, methoxyphenyl, 2,4 - dichlorophenylethyl, 3,4,5 - tri - methoxyphenyl, 3-chlor-4-methylmercaptophenyl, and the like.

When R and R' represent a monocarbocyclic aryl radical, the monocarbocyclic aryl moiety has the same meaning as given above.

The compounds of the invention can be prepared by the following series of reactions:

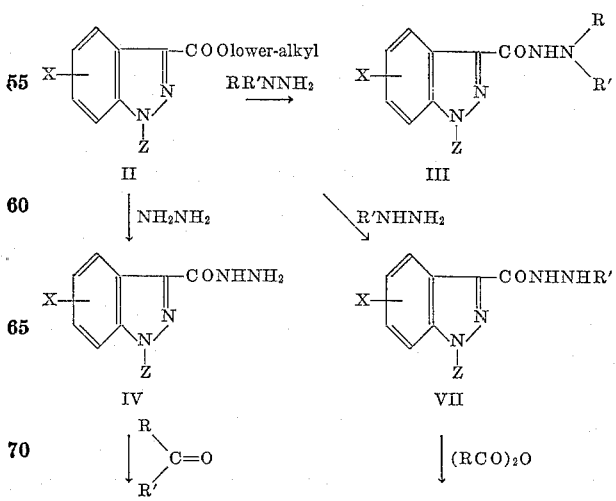

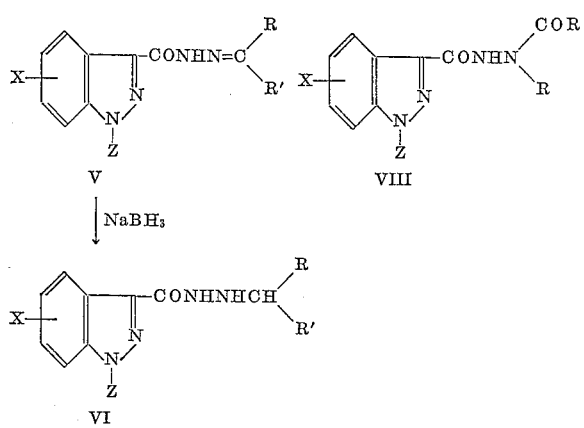

An appropriately substituted lower-alkyl 3-indazolecarboxylate (II) is treated with hydrazine to give the hydrazide or N-(3-indazolecarbonyl)hydrazine (IV). The reaction is carried out under anhydrous conditions in an inert solvent such as benzene toluene, ethanol or the like, and takes place at temperatures between about 50° C. and about 125° C., and the best mode for carrying out the reaction consists of selecting a solvent that boils in this range and conducting the reaction at the reflux temperature.

The hydrazide IV can be converted if desired to a hydrazone or $N^1,N^2$-disubstituted hydrazine (V) by treatment with a selected aldehyde or ketone RR'C=O, where R and R' have the meanings given above. The reaction may be carried out by mixing the reactants in an inert solvent, for example a lower-alkanol, at temperatures somewhat above room temperature but it is preferred to accomplish the reaction at the reflux temperature of the solvent in the presence of an acid as, for example, glacial acetic acid.

The hydrazones of Formula V can be reduced to the hydrazines of Formula VI by heating the hydrazone with a reducing agent effective in reducing a hydrazono group to a hydrazo group as for example sodium borohydride.

The appropriately substituted lower alkyl 3-indazolecarboxylate II can also be treated with N-substituted or N,N-disubstituted hydrazines to give the corresponding $N^1$-(3-indazolecarbonyl)-$N^2$-substituted hydrazines (VII) or $N^1$-(3-indazolecarbonyl)-$N^2,N^2$-disubstituted hydrazines (III) respectively. The reaction is carried out under anhydrous conditions in an inert solvent such as methanol, ethanol, benzene, toluene and the like. While the reaction takes place at lower temperatures it is convenient to carry out the reaction at a temperature between about 50° C. and about 135° C., preferably at the reflux temperature of a solvent boiling in this range.

The hydrazines of Formula VII can be converted to the compounds of Formula VIII by heating with the appropriate acid anhydride, $(RCO)_2O$.

An alternative approach to the compounds of the invention of Formulas III, IV and VII (X and Y=hydrogen) consists in warming the appropriate hydrazine with the known diindazolo[2,3-a,2',3'-d] pyrazine-7,14-dione having the formula

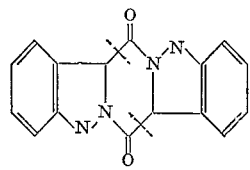

and which acts as an acylating agent by virtue of the rupture of bonds indicated by the dotted lines in the above formula.

The intermediates having the structure II are a known class of compounds which can be prepared by treatment of selected hydrazones of lower-alkyl o-nitrophenylglyoxylates with alkali. The compounds of Formula II wherein X and Y are hydrogen atoms can be prepared from isatin by known methods.

The structures of the novel compounds herein disclosed are established by their mode of synthesis and corroborated by the correspondence of calculated and found values for the elementary analyses for representative examples.

The compounds of the invention having the general Formula I possess valuable pharmacodynamic properties, in particular, anorexigenic activity. The anorexigenic activity is manifested by sharp reductions in the food intake of dogs and cats when the compounds are administered either orally or subcutaneously at dosage levels causing no other pharmacological effects.

The compounds of Formula I can be prepared for use by formulation in isotonic aqueous solutions for subcutaneous or intramuscular injection, or in solid form as tablets or powders. The tablet formulation can be prepared using conventional excipients, and the powder can be compounded in capsule form. These preparations can be administered orally or, in the case of aqueous preparations, intramuscularly, intraperitoneally or intravenously.

The following examples will further illustrate the invention without being limited thereby.

EXAMPLE 1

*N-(3-indazolecarbonyl)hydrazine*

A mixture of 9 g. of methyl 3-indazolecarboxylate and 5 cc. of 100% hydrazine hydrate in 50 cc. of absolute ethanol was refluxed for six hours on a steam bath then left standing overnight at room temperature. The solid which separated was removed by filtration, washed with alcohol and dried. Recrystallization from absolute ethanol gave 3.8 g. of N-(3-indazolecarbonyl)hydrazine, M.P. 218–220° C. (corr.).

*Analysis.*—Calcd. for $C_8H_8N_4O$: N, 31.80. Found: N, 32.24.

The N-(3-indazolecarbonyl)hydrazine was found to cause an 85% reduction in the food intake of cats with no other observable pharmacological effects when administered at a level of 16 mg./kg. using the following procedure. Cats are divided into groups of five and the average daily food intake for each group of five is measured and calculated for the week prior to the test. During the week of the test each group of five cats is medicated with a given compound while a control group is medicated with the same volume of saline. The average daily intake for each group is again measured and the changes in food intake plotted graphically and compared with the control values.

EXAMPLE 2

N-(6-nitro-1-phenyl-3-indazolecarbonyl)hydrazine was prepared from 14.9 g. of methyl 6-nitro-1-phenyl-3-indazolecarboxylate and 9.7 ml. of 100% hydrazine hydrate in 125 cc. of absolute ethanol according to the procedure described above in Example 1. After recrystallization from absolute ethanol there was obtained 6.4 g. of N-(6-nitro-1-phenyl-3-indazolecarbonyl)hydrazine, M.P. 222–225° C. (corr.).

*Analysis.*—Calcd. for $C_{14}H_{11}N_5O_3$: C, 56.56; H, 3.73; N, 23.56. Found: C, 56.79; H, 3.82; N, 23.30.

EXAMPLE 3

N-(6-amino-1-phenyl-3-indazolecarbonyl)hydrazine was prepared from 10 g. of methyl 6-amino-1-phenyl-3-indazolecarboxylate and 7.3 cc. of 100% hydrazine hydrate in 95 cc. of absolute ethanol according to the procedure described above in Example 1. The N-(6-amino- 1-phenyl-3-indazolecarbonyl)hydrazine thus obtained had the M.P. 187–191° C. (corr.).

*Analysis.*—Calcd. for $C_{14}H_{13}N_5O$: C, 62.91; H, 4.90; N, 26.21. Found: C, 63.05; H, 4.61; N, 26.50.

N - (6-amino-1-phenyl)-3-indazolecarbonyl)hydrazine was found to have anorexigenic activity with no other observable pharmacological effects at levels of 4 and 16 mg./kg.

EXAMPLE 4

N-(5-bromo-3-indazolecarbonyl)hydrazine was prepared from 7.3 g. of methyl 5-bromo-3-indazolecarboxylate and 5.4 cc. of 100% hydrazine hydrate in 150 ml. of absolute ethanol acccording to the procedure described above in Example 1. After recrystallization from absolute ethanol there was obtained 4.6 g. of N-(5-bromo-3-indazolecarbonyl)hydrazine, M.P. 300° C. (corr.).

*Analysis.*—Calcd. for $C_8H_7BrN_4O$: Br, 31.33; N, 21.96. Found: Br, 31.17; N, 21.71.

EXAMPLE 5

N-(1-methyl - 3 - indazolecarbonyl)hydrazine was prepared from 8.35 g. of methyl 1-methyl-3-indazolecarboxylate and 8.8 g. of 100% hydrazine hydrate in 150 ml. of absolute ethanol according to the procedure described above in Example 1. Recrystallization from absolute ethanol gave 5.6 g. of N-(1-methyl-3-indazolecarbonyl) hydrazine, M.P. 173–175° C. (corr.).

*Analysis.*—Calcd. for $C_9H_{10}N_4O$: C, 56.83; H, 5.30; N, 29.46. Found: C, 56.98; H, 5.42; N, 29.48.

N-(1-methyl-3-indazolecarbonyl)hydrazine was found to have anorexigenic activity with no other observable pharmacological effects at levels of 4, 8 and 16 mg./kg.

EXAMPLE 6

N-(1-benzyl - 3 - indazolecarbonyl)hydrazine was prepared from 7.81 g. of methyl 1-benzyl-3-indazolecarboxylate and 5.86 g. of 100% hydrazine hydrate in 120 ml. of absolute ethanol according to the procedure described above in Example 1. There was thus obtained 5.5 g. of N-(1-benzyl-3-indazolecarbonyl)hydrazine, M.P. 129–133° C. (corr.).

*Analysis.*—Calcd. for $C_{15}H_{14}N_4O$: C, 67.65; H, 5.30; N, 21.04. Found: C, 67.72; H, 5.12; N, 20.97.

N-(1-benzyl-3-indazolecarbonyl)hydrazine was found to have anorexigenic activity with no other observable pharmacological effects at levels of 4, 8 and 16 mg./kg.

EXAMPLE 7

N-(1-phenyl-3-indazolecarbonyl)hydrazine was prepared from 9.9 g. of methyl 1-phenyl-3-indazolecarboxylate and 7.85 g. of 100% hydrazine hydrate in 120 ml. of absolute ethanol according to the procedure described above in Example 1. After recrystallization from absolute alcohol there was obtained 6.7 g. of light tan crystals of N-(1-phenyl-3-indazolecarbonyl)hydrazine, M.P. 137–139° C. (corr.).

*Analysis.*—Calcd. for $C_{14}H_{12}N_4O$: C, 66.65; H, 4.80; N, 22.21. Found: C, 66.82; H, 4.73; N, 22.33.

N-(1-phenyl-3-indazolecarbonyl)hydrazine was found to have anorexigenic activity with no other observable pharmacological effects at levels of 8, 16 and 32 mg./kg.

EXAMPLE 8

N-[6-methyl-1-(2,4,6-trichlorophenyl - 3 - indazolecarbonyl]-hydrazine can be prepared by reacting ethyl 6-methyl-1-(2,4,6 - trichlorophenyl)-3-indazolecarboxylate with hydrazine hydrate using the procedure described above in Example 1.

EXAMPLE 9

N-(5,7-dichloro-1-ethyl-3 - indazolecarbonyl)hydrazine can be prepared by reacting methyl 5,7-dichloro-1-ethyl-3-indazolecarboxylate with hydrazine hydrate using the procedure described above in Example 1.

EXAMPLE 10

N-(5-butoxy-3-indazolecarbonyl)hydrazine can be prepared by reacting methyl 5-butoxy-3-indazolecarboxylate with hydrazine hydrate using the procedure described above in Example 1.

EXAMPLE 11

N-(1-n-hexyl-3-indazolecarbonyl)hydrazine can be prepared by reacting n-propyl 1-n-hexyl-3-indazolecarboxylat with hydrazine hydrate using the procedure described above in Example 1.

EXAMPLE 12

N-(6-n-butyl-1-allyl-3-indazolecarbonyl)hydrazine can be prepared by reacting methyl 6-n-butyl-1-allyl-3-indazolecarboxylate with hydrazine hydrate using the procedure described above in Example 1.

EXAMPLE 13

N-(5-fluoro-1-phenyl-3-indazolecarbonyl)hydrazine can be prepared by reacting ethyl 5-fluoro-1-phenyl-3-indazolecarboxylate and hydrazine hydrate using the procedure described above in Example 1.

EXAMPLE 14

*(a) Diindazolo[2,3-a,2′,3′-d]pyrazine-7,14-dione*

A slurry of 5.3 g. of 3-indazolecarboxylic acid and 100 cc. of thionyl chloride was refluxed for two hours. The addition of a large volume of benzene caused the separation of a solid which was collected by filtration then suspended in n-pentane. The orange solid was collected by filtration and purified by extraction with boiling acetone. There was thus obtained 3.5 g. of diindazolo[2,3-a,2′,3′-d]pyrazine-7,14-dione, melting above 350° C.

*Analysis.*—Calcd. for $C_{16}H_8N_4O_2$: C, 66.66; H, 2.80; N, 19.44. Found: C, 66.49; H, 3.24; N, 19.45.

*(b) 1-(3-indazolecarbonyl)-2,2-dimethylhydrazine*

A mixture of 14.4 g. of diindazolo[2,3-a,2′,3′-d]pyrazine-7,14-dione and 40 cc. of 1,1-dimethylhydrazine was warmed on a steam bath for one hour and then cooled. The solid which separated was collected by filtration, washed with water and extracted with ethyl acetate. The white 1-(3-indazolecarbonyl)-2,2-dimethylhydrazine thus obtained had the M.P. 223–225° C. (corr.).

*Analysis.*—Calcd. for $C_{10}H_{12}N_4O$: C, 58.81; H, 5.92; N, 27.44. Found: C, 58.74; H, 5.63; N, 27.40.

EXAMPLE 15

1-(3-indazolecarbonyl)-2,2-dibenzylhydrazine was prepared from 9.5 g. of diindazolo[2,3-a,2′,3′-d]pyrazine-7,14-dione and 14 g. of 1,1-dibenzylhydrazine using the procedure described above in Example 14(*b*). The reaction mixture was taken up in warm benzene, the insoluble material removed by filtration and n-hexane added to the filtrate. The buff solid which precipitated was collected by filtration, washed with n-hexane and dried. Recrystallization from a dimethyl formamide water mixture gave 3 g. of 1-(3-indazolecarbonyl)-2,2-dibenzylhydrazine which softened at 155.4° C. with an indefinite melting point.

*Analysis.*—Calcd. for $C_{22}H_{20}N_4O$: C, 74.13; H, 5.66; N, 15.72. Found: C, 74.49; H, 5.88; N, 15.50.

1 - (3 - indazolecarbonyl) - 2,2 - dibenzylhydrazine was found to have anorexigenic activity with no other observable pharmacological effects at dosage levels of 64, 100 and 160 mg./kg.

EXAMPLE 16

1-(3-indazolecarbonyl)-2,2-dihexylhydrazine can be prepared by reacting diindazolo[2,3-a,2′,3′-d]pyrazine-7,14-dione with 1,1-dihexylhydrazine using the procedure described above in Example 14(*b*).

EXAMPLE 17

1-(3-indazolecarbonyl)-2-(2,4 - dibromophenyl)hydrazine can be prepared by reacting diindazolo[2,3-a,2',3'-d]pyrazine-7,14-dione with 2,4-dibromophenylhydrazine using the procedure described above in Example 14(b).

EXAMPLE 18

1-(3-indazolecarbonyl) - 2 - (2-phenylethyl)hydrazine can be prepared by reacting diindazolo[2,3-a,2',3'-d]pyrazine-7,14-dione with 2-phenylethylhydrazine using the procedure described above in Example 14(b).

EXAMPLE 19

1 - (3-indazolecarbonyl)-2-methyl-2-(2-nitro-4-chlorophenyl)-hydrazine can be prepared by reacting diindazolo[2,3-a,2',3'-d]-pyrazine - 7,14 - dione with 2-nitro-4-chlorophenylhydrazine using the procedure described above in Example 14(b).

EXAMPLE 20

1 - (3 - indazolecarbonyl)-2-isopropylhydrazine can be prepared by reacting diindazolo[2,3-a,2',3'-d]pyrazine-7,14-dione with isopropylhydrazine using the procedure described above in example 14(b) or by the procedure described below in Example 34.

EXAMPLE 21

1 - (3 - indazolecarbonyl)-2-(2-methoxyphenyl)hydrazine can be prepared by reacting diindazolo[2,3-a,2',3'-d]-pyrazine - 7,14 - dione with 2 - methoxyphenylhydrazine using the procedure described above in Example 14(b).

EXAMPLE 22

1 - (3 - indazolecarbonyl)-2-phenyl-2-benzylhydrazine can be prepared by reacting diindazolo[2,3-a,2',3'-d]-pyrazine - 7,14 - dione with 2 - phenyl-2-benzylhydrazine using the procedure described above in Example 14(b).

EXAMPLE 23

1 - (3 - indazolecarbonyl)-2-(4-methylbenzyl)hydrazine can be prepared by reacting diindazolo[2,3-a,2',3'-d]-pyrazine-7,14-dione with 4-methylbenzylhydrazine using the procedure described above in Example 14(b).

EXAMPLE 24

1 - (3 - indazolecarbonyl)-2-(4-fluorophenyl)hydrazine can be prepared by reacting diindazolo[2,3-a,2',3'-d]pyrazine-7,14-dione with 4-fluorophenylhydrazine using the procedure described above in Example 14(b).

EXAMPLE 25

*1-(3-indazolecarbonyl)-2-isopropylidenehydrazine*

To a solution of 7.76 g. of 3-indazolecarboxylic acid hydrazide in 350 cc. of anhydrous ethanol was added 4 cc. of acetone and 2 drops of glacial acetic acid and the mixture refluxed for one hour. The tan solid which separated was collected by filtration, soaked in hot anhydrous ethanol and recovered by filtration. After drying in a vacuum oven at 100° C. there was obtained 8 g. of 1 - (3-indazolecarbonyl)-2-isopropylidenehydrazine, M.P. 304–306° C. (uncorr.).

*Anal.*—Calcd. for $C_{11}H_{12}N_4O$: C, 61.10; H, 5.60; N, 25.91. Found: C, 60.82; H, 5.90; N, 26.10.

1-(3-indazolecarbonyl)-2-isopropylidenehydrazine was found to have anorexigenic activity with no other observable pharmacological effects at dosage levels of 8, 16 and 32 mg./kg.

EXAMPLE 26

1 - (3 - indazolecarbonyl)-2-(4-chlorobenzylidene)hydrazine was prepared from 17.6 g. of 3-indazolecarboxylic acid hydrazide and 14.1 g. of p-chlorobenzaldehyde and 3 drops of glacial acetic acid in 700 cc. of anhydrous ethanol using the procedure described above in Example 25. After drying at 75° there was obtained 22.6 g. of 1-(3-indazolecarbonyl)-2-(4-chlorobenzylidene)hydrazine, M.P. 321–323° C. (uncorr.).

*Anal.*—Calcd. for $C_{15}H_{11}ClN_4O$: Cl, 11.87; N, 18.76. Found: Cl, 11.74; N, 18.38.

EXAMPLE 27

1 - (6-nitro-1-phenyl-3-indazolecarbonyl)-2-(α-methylbenzylidene)hydrazine can be prepared by reacting 6-nitro-1-phenyl-3-indazolecarboxylic acid hydrazide and acetophenone using the procedure described above in Example 25.

EXAMPLE 28

1 - (5 - bromo - 1 - methyl-3-indazolecarbonyl)-2-(4-methoxybenzylidene)hydrazine can be prepared by reacting 5-bromo-1-methyl-3-indazolecarboxylic acid hydrazide with 4-methoxybenzaldehyde using the procedure described above in Example 25.

EXAMPLE 29

1 - (1 - benzyl-3-indazolecarbonyl)-2-(2,4-diiodobenzylidene)-hydrazine can be prepared by reacting 1-benzyl-3-indazolecarboxylic acid hydrazide with 2,4-diiodobenzaldehyde using the procedure described above in Example 25.

EXAMPLE 30

1 - (3 - indazolecarbonyl)- 2- (3 - methylmercaptobenzylidene)-hydrazine can be prepared by reacting 3-indazolecarboxylic acid hydrazide with 3-methylmercaptobenzaldehyde using the procedure described above in Example 25.

EXAMPLE 31

1 - (7 - methyl-3-indazolecarbonyl)-2-hexylidenehydrazine can be prepared by reacting 3-indazolecarboxylic acid hydrazide with hexanal using the procedure described above in Example 25.

EXAMPLE 32

1 - (3 - indazolecarbonyl) - 2 - benzohydrylidenehydrazine can be prepared by reacting 3-indazolecarboxylic acid hydrazide with benzophenone using the procedure described above in Example 25.

EXAMPLE 33

1 - (7 - chloro-1-phenyl-3-indazolecarbonyl)-2-(sec. butylidene)hydrazine can be prepared by reacting 7-chloro-1-phenyl-3-indazolecarboxylic acid hydrazide with methylethyl ketone using the procedure described above in Example 25.

EXAMPLE 34

*1-(3-indazolecarbonyl)-2-isopropylhydrazine*

A suspension of 23.2 g. of 1-(3-indazolecarbonyl)-2-isopropylidenehydrazine (Ex. 25) in 425 ml. of anhydrous methanol was refluxed for a short time then cooled. To the suspension was added in small portions 4.05 g. of sodium borohydride and the mixture refluxed for twenty minutes. Addition of 425 cc. of cold water caused the separation of a solid which was removed by filtration and discarded. Concentration of the filtrate gave a pale yellow solid which was collected by filtration and dried. After recrystallization from ethanol there was obtained 14.8 g. of 1-(3-indazolecarbonyl)-2-isopropylhydrazine, M.P. 171–174° C. (corr.).

*Anal.*—Calcd. for $C_{11}H_{14}N_4O$: C, 60.53; H, 6.47 N, 25.67. Found: C, 60.69; H, 6.25; N, 25.93.

1 - (3 - indazolecarbonyl) - 2 - isopropylhydrazine was found to have anorexigenic activity with no other observable pharmacological effects at dosage levels of 4, 8 and 16 mg./kg.

EXAMPLE 35

1 - (3 - indazolecarbonyl) - 2 - (4-chlorobenzyl)hydrazine can be prepared by reducing the 1-(3-indazolecarbonyl)-2-(4-chlorobenzylidene)hydrazine of Example 26 with sodium borohydride using the procedure described above in Example 34.

EXAMPLE 36

1-(7-chloro-1-phenyl-3-indazolecarbonyl)-2-sec. butylhydrazine can be prepared by reducing the 1-(7-chloro-1-phenyl-3-indazolecarbonyl)-2-(sec. butylidene) of Example 33 with sodium borohydride using the procedure described above in Example 34.

EXAMPLE 37

*1-(3-indazolecarbonyl)-2-acetylhydrazine*

To a hot solution of 12.3 g. of 3-indazolecarboxylic acid hydrazide in one liter of water was added with stirring 14.3 g. of acetic anhydride. The solid which precipitated was collected by filtration, washed with water and dried. Recrystallization from anhydrous ethanol gave 11 g. of 1-(3-indazolecarbonyl)-2-acetylhydrazine, M.P. 255–256° C. (corr.).

*Anal.*—Calcd. for $C_{10}H_{10}N_4O_2$: C, 55.04; H, 4.62; N, 25.68. Found: C, 55.31; H, 4.97; N, 25.44.

EXAMPLE 38

1-(1-phenyl-3-indazolecarbonyl)-2-caproylhydrazine can be prepared by acylating 1-phenyl-3-indazolecarboxylic acid hydrazide with caproic anhydride using the procedure described above in Example 37.

EXAMPLE 39

1-(5-bromo-1-methyl-3-indazolecarbonyl)-2-phenyl-2-butyrylhydrazine can be prepared by acylating 1-(5-bromo-1-methyl-3-indazolecarbonyl)-2-phenylhydrazine with butyric anhydride using the procedure described above in Example 37.

EXAMPLE 40

1-(3-indazolecarbonyl)-2-isovalerylhydrazine can be prepared by acylating 3-indazolecarboxylic acid hydrazide with isovaleric anhydride using the procedure described above in Example 37.

EXAMPLE 41

*N-(4,5,6,7-tetrahydro-3-indazolecarbonyl)hydrazine*

A mixture of 9.7 g. of ethyl 4,5,6,7-tetrahydro-3-indazolecarboxylate and 9.7 cc. of 100% hydrazine hydrate in 300 cc. of absolute ethanol was refluxed for six and one-half hours then cooled. The solid which separated was collected by filtration and washed with water. Recrystallization from absolute alcohol followed by drying at 75° C. gave 6 g. of N-(4,5,6,7-tetrahydro-3-indazolecarbonyl)hydrazine, M.P. 176–179° C. (corr.).

*Anal.*—Calcd. for $C_8H_{12}N_4O$: C, 53.22; H, 6.71; N, 31.09. Found: C, 53.27; H, 6.96; N, 31.15.

N-(4,5,6,7-tetrahydro-3-indazolecarbonyl)hydrazine was found to have anorexigenic activity with no other observable pharmacological effects at dosage levels of 4, 8 and 16 mg./kg.

EXAMPLE 42

*N-(2-methyl-3-indazolecarbonyl)hydrazine*

To a solution of 5.33 g. of methyl 2-methyl-3-indazolecarboxylate in 20 cc. of anhydrous ethanol was added 4.2 g. of hydrazine hydrate and the mixture refluxed for two and one half hours. Concentration of the resultant yellow solution under reduced pressure caused the separation of a yellow solid which was collected by filtration. After three recrystallizations from anhydrous ethanol there was obtained 1 g. of N-(2-methyl-3-indazolecarbonyl)hydrazine, M.P. 152–153° C. (corr.).

*Anal.*—Calcd. for $C_9H_{10}N_4O$: C, 56.83; H, 5.30; $N_{amino}$, 7.37. Found: C, 56.95; H, 5.20; $N_{amino}$, 7.46.

I claim:
1. 1-(3-indazolecarbonyl)-2-lower-alkylidenehydrazine.
2. 1-(3-indazolecarbonyl)hydrazine.
3. 1-(6-amino-3-indazolecarbonyl)hydrazine.
4. 1-(1-methyl-3-indazolecarbonyl)hydrazine.
5. 1-(1-benzyl-3-indazolecarbonyl)hydrazine.
6. 1-(1-phenyl-3-indazolecarbonyl)hydrazine.
7. 1-(3-indazolecarbonyl)-2,2-dimethylhydrazine.
8. 1-(3-indazolecarbonyl)-2,2-dibenzylhydrazine.
9. 1-(3-indazolecarbonyl)-2-isopropylidenehydrazine.
10. 1-(3-indazolecarbonyl)-2-isopropylhydrazine.
11. 1-(3-indazolecarbonyl)-2-acetylhydrazine.
12. 1-(4,5,6,7-tetrahydro-3-indazolecarbonyl)hydrazine.
13. The process for preparing the compound having the formula

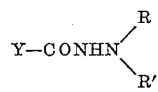

wherein Y is a 3-indazole- and R and R' are members selected from the group consisting of hydrogen, lower-aliphatic hydrocarbon, monocarbocyclic aryl and monocarbocyclic aryl-substituted lower-aliphatic hydrocarbon which comprises heating lower-alkyl 3-indazolecarboxylates with the hydrazine having the formula RR'NNH₂.

14. The process for preparing the compound having the formula

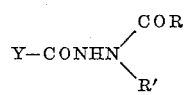

wherein Y is 3-indazole- and R and R' are members selected from the group consisting of hydrogen, lower-aliphatic hydracarbon, monocarbocyclic aryl and monocarbocyclic aryl-substituted lower-aliphatic hydrocarbon, the steps of which comprise heating lower-alkyl 3-indazolecarboxylates with the hydrazine having the formula R'NHNH₂ and heating the resultant hydrazine with (RCO)₂O.

15. The process for preparing the compound having the formula

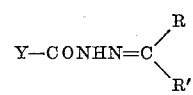

wherein Y is 3-indazole- and R and R' are members selected from the group consisting of hydrogen, lower-aliphatic hydrocarbon, monocarbocyclic aryl and monocarbocyclic aryl-substituted lower-aliphatic hydrocarbon which comprises heating the compound having the formula Y—CONHNH₂ with RR'CO.

16. The process for preparing the compound having the formula Y—CONHNH₂ wherein Y is 3-indazole- which comprises heating lower-alkyl 3-indazolecarboxylates with hydrazine.

17. The process for preparing the compound having the formula

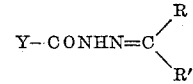

wherein Y is 3-indazole- and R and R' are lower-aliphatic hydrocarbons which comprises heating the hydrazine having the formula Y—CONHNH₂ with RR'CO.

18. The process for preparing 1-(3-indazolecarbonyl)-hydrazine which comprises heating methyl 3-indazolecarboxylate with hydrazine.

19. The process for preparing 1-(3-indazolecarbonyl) 2-isopropylidenehydrazine which comprises heating 1-(3-indazolecarbonyl)hydrazine with acetone.

20. A compound having the formula Y—CONHN=B wherein Y is 3-indazole- and N=B is a member selected from the group consisting of

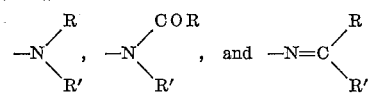

wherein R and R' are each a member selected from the group consisting of hydrogen, lower-aliphatic hydrocarbon, moncarbocyclic aryl and monocarbocyclic aryl-substituted lower-aliphatic hydrocarbon.

References Cited in the file of this patent

UNITED STATES PATENTS 2,689,852 Fox _____ Sept. 21, 1954
2,767,192 Offe et al. _____ Oct. 16, 1956

FOREIGN PATENTS 801,537 Great Britain _____ Sept. 17, 1958

UNITED STATES PATENT OFFICE
CERTIFICATE OF CORRECTION

Patent No. 3,007,938                               November 7, 1961

Frederick K. Kirchner

It is hereby certified that error appears in the above numbered patent requiring correction and that the said Letters Patent should read as corrected below.

Column 3, line 10, for "$NaBH_3$" read -- $NaBH_4$ --; column 10, line 19, after "is" strike out -- a --; line 67, for "hydrocarbons" read -- hydrocarbon --.

Signed and sealed this 15th day of May 1962.

(SEAL)
Attest:

ERNEST W. SWIDER                                    DAVID L. LADD
Attesting Officer                                       Commissioner of Patents